US012252392B2

(12) United States Patent
Markarian

(10) Patent No.: US 12,252,392 B2
(45) Date of Patent: Mar. 18, 2025

(54) DEVICE AND METHOD FOR REDUCING CONTACT BETWEEN A WALL AND A BED FRAME

(71) Applicant: Peter Markarian, Tamarac, FL (US)

(72) Inventor: Peter Markarian, Tamarac, FL (US)

( * ) Notice: Subject to any disclaimer, the term of this patent is extended or adjusted under 35 U.S.C. 154(b) by 0 days.

(21) Appl. No.: 18/139,396

(22) Filed: Apr. 26, 2023

(65) Prior Publication Data

US 2023/0339740 A1 Oct. 26, 2023

Related U.S. Application Data

(60) Provisional application No. 63/334,735, filed on Apr. 26, 2022.

(51) Int. Cl.
*A47C 31/00* (2006.01)
*A47C 19/02* (2006.01)
*B68G 13/00* (2006.01)

(52) U.S. Cl.
CPC .............. *B68G 13/00* (2013.01); *A47C 19/02* (2013.01); *A47C 31/00* (2013.01)

(58) Field of Classification Search
CPC ................................ B68G 13/00; A47C 31/00
USPC ........................................... 248/345.1; 5/658
See application file for complete search history.

(56) References Cited

U.S. PATENT DOCUMENTS 3,299,451 A * 1/1967 Trogdon .................. A47G 9/10 5/636
4,876,755 A * 10/1989 Parrish ................. A47C 20/027 5/636
5,382,078 A * 1/1995 Lanteri .................. B60N 2/882 297/391
5,700,053 A 12/1997 Downing
6,182,307 B1 * 2/2001 Rutrick ................ A47C 19/022 D6/718.19
7,311,958 B2 12/2007 Morris
8,375,487 B1 * 2/2013 Mohr ..................... A47C 21/00 5/503.1
8,708,416 B2 4/2014 Stronconi
9,827,889 B1 * 11/2017 Cline ....................... B60N 2/78
10,172,468 B2 * 1/2019 Houghson .............. F16M 11/28
10,342,357 B2 * 7/2019 Backus, III ............ A47C 19/02
D911,480 S 2/2021 Lin
D931,398 S 9/2021 Wilson et al.
11,503,818 B2 * 11/2022 Parker ...................... F16B 7/105
11,505,440 B1 * 11/2022 Christensen ............ B66F 13/00
11,759,013 B2 * 9/2023 Pierpont ................ A47B 97/00 248/205.3

(Continued)

FOREIGN PATENT DOCUMENTS

AU 2011100666 A4 8/2011
AU 2011240876 B2 10/2011

*Primary Examiner* — Todd M Epps
(74) *Attorney, Agent, or Firm* — John Rizvi; John Rizvi, P.A.—The Patent Professor®

(57) ABSTRACT

A device for reducing contact between a wall of a structure and a headboard of a bed frame. The device may include an elongated body comprising a cushioning material, and an attachment system for releasably securing the elongated body to the wall of the structure in an elevated position relative to a floor of the structure and between the wall and the headboard of the bed frame. In this arrangement. the elongated body may function as a physical barrier between the wall and the headboard.

20 Claims, 9 Drawing Sheets

(56) References Cited

U.S. PATENT DOCUMENTS

| | | | | |
|---|---|---|---|---|
| 2009/0256037 | A1* | 10/2009 | Singh .................. | A47C 19/022 248/205.6 |
| 2012/0005835 | A1* | 1/2012 | Betesh ................ | A47C 19/022 5/658 |

* cited by examiner

DEVICE AND METHOD FOR REDUCING CONTACT BETWEEN A WALL AND A BED FRAME

CROSS-REFERENCE TO RELATED APPLICATIONS

This application claims the benefit of U.S. Provisional Patent Application No. 63/334,735, filed on Apr. 26, 2022, which is incorporated by reference herein in its entirety.

FIELD OF THE INVENTION

The present invention relates generally to bed frames, and more particularly, to a device to reduce the likelihood of damage between a wall and a headboard of a bed frame.

BACKGROUND OF THE INVENTION

In the United States and certain other countries, beds typically include a mattress supported on a bed frame. Bed frames for these types of beds include a bed base for directly supporting a mattress thereon which may include, for example, wooden slats laid across the bed frame and/or a box spring. The bed frame may include a head rail, a foot rail, and a pair of side rails that in combination form a rectangle for supporting the bed base. Feet or legs may be included for supporting the head, foot, and side rails in an elevated position. In many instances, a headboard may be coupled to the head and foot rails, respectfully.

The headboard was originally configured to provide a barrier between the head of the bed and an adjacent wall to protect individuals sleeping on the bed cold air and/or cold surfaces. In particular, cold air was able to sink toward the floor between the wall and the headboard, rather than become trapped on the mattress. In addition, headboards could be formed of materials that were less thermally conductive than the adjacent wall (e.g., wood headboard adjacent stone or brick wall). Today, improvements in heating and insulation have rendered such functionality unnecessary. However, headboards and footboards have remained popular and are generally used primarily for aesthetics.

Headboards are available in a wide variety of shapes, sizes, and materials. Often, headboards connect to the head rail and/or the side rails of the bed frame and extend upwards past the bed base and the mattress thereon. Since modern headboards are typically used for aesthetic appeal, the headboard may extend to a relatively significant height above the head rail and side rails such that the aesthetic features of the headboard may be viewable above the mattress and any pillows or blankets thereon. In such instances, the connection between the head rail, side rails, and the headboard may not be sufficiently rigid to prevent movement of the headboard when an individual on the bed is moving, especially at portions of the headboard furthest from the connection to the head rail and/or side rails. This movement of the headboard may cause contact between the headboard and the adjacent wall which may cause undesirable noise and, in some instances, cause damage to the wall and/or the headboard.

Various attempts have been made to address this issue. The connection between the headboard and the head and/or side rails may be tightened to at least partially to reduce movement of the headboard; however, movement of the bed often loosens these connections over time and may require frequent re-tightening. The bed frame may be reinforced; however, this may not be practical or desirable.

Accordingly, there is an established need for a convenient device capable of reducing the likelihood of contact and/or damage between a wall and a headboard of a bed frame.

SUMMARY OF THE INVENTION

The present invention is directed to a convenient and economical device for reducing contact between a wall of a structure and a headboard of a bed frame. The device may include an elongated body comprising a cushioning material, and an attachment system for releasably securing the elongated body to the wall of the structure in an elevated position relative to a floor of the structure and between the wall and the headboard of the bed frame. In this arrangement. the elongated body may function as a physical barrier between the wall and the headboard.

In a first implementation of the invention, a device is provided for reducing contact between a wall of a structure and a headboard of a bed frame. The device comprises an elongated body comprising a cushioning material, and an attachment system for releasably securing the elongated body to the wall of the structure in an elevated position relative to a floor of the structure and between the wall and the headboard of the bed frame. The elongated body is configured to function as the physical barrier between the wall and the headboard when secured to the wall with the attachment system.

In a second aspect, the elongated body may be formed of a cushioning material.

In another aspect, the elongated body may be formed of a foam material.

In another aspect, the elongated body may have a cylindrical shape.

In another aspect, the elongated body may have a truncated cylindrical shape with a planar surface extending along the length of the elongated body.

In another aspect, the attachment system may be secured to the planar surface of the elongated body.

In another aspect, the device may include a cover configured to enclose the elongated body.

In another aspect, the cover may be configured to be removeable from the elongated body.

In another aspect, the cover may include an opening sized to receive the elongated body therethrough and a fastener device for selectively closing and securing the opening.

In another aspect, the fastener device may be a zipper.

In another aspect, the attachment system may include a hook and loop fastener.

In another aspect, a portion of the hook and loop fastener may be secured to the wall with a releasable adhesive material.

In another aspect, a method is provided for reducing contact between a wall of a structure and a headboard of a bed frame. The method comprises providing a device that includes an elongated body comprising a cushioning material, securing the elongated body to the wall of the structure in an elevated position relative to a floor of the structure with an attachment system of the device, locating the headboard of the bed frame adjacent to and/or in contact with the device such that the device is between the wall and the headboard of the bed frame, and using the elongated body as a physical barrier between the wall and the headboard when secured to the wall with the attachment system.

In another aspect, the method may include positioning the device such that the elongated body provides uniform resistance along the headboard when in contact therewith.

In another aspect, the elongated body may have a cylindrical shape and the method may include contacting the wall and the headboard with curved surfaces of the device.

In another aspect, the elongated body may have a truncated cylindrical shape with a planar surface extending along the length of the elongated body and the method may include positioning the elongated body such that the planar surface contacts the wall.

In another aspect, the attachment system may be secured to the planar surface of the elongated body.

In another aspect, the method may include removably enclosing the elongated body within a cover of the device.

In another aspect, the cover may include an opening sized to receive the elongated body therethrough and the method may include selectively closing and securing the opening with a fastener device, such as a zipper.

In another aspect, the attachment system may include a hook and loop fastener.

In another aspect, the method may include securing a portion of the hook and loop fastener to the wall with a releasable adhesive material.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
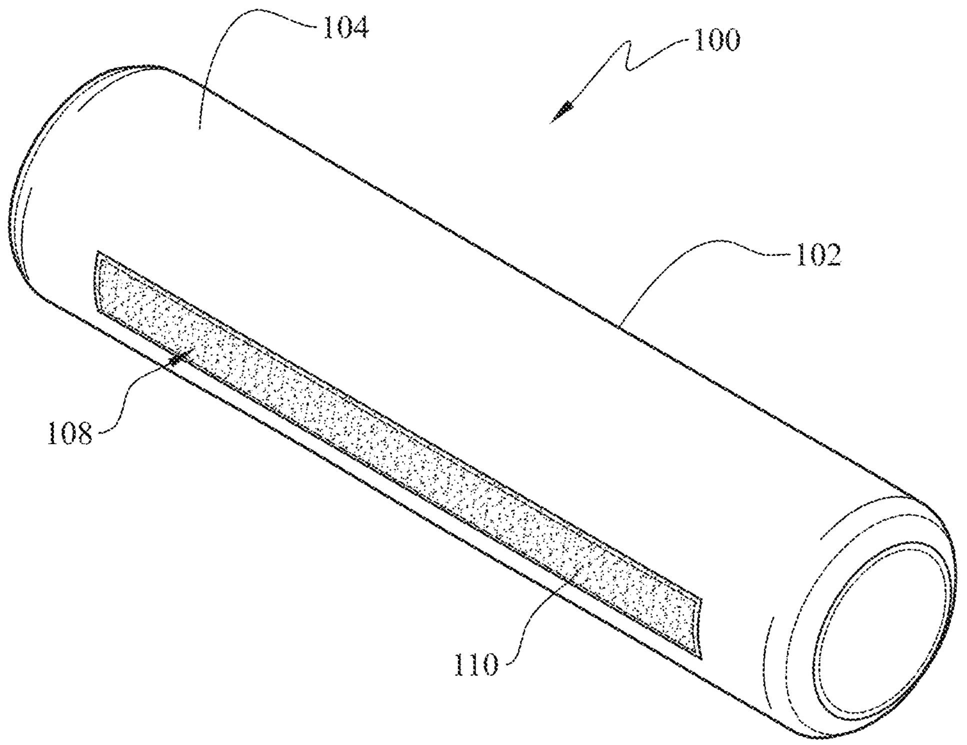
FIG. 1 presents a perspective view of a device for reducing contact between a wall of a structure and a headboard of a bed frame in accordance with a first embodiment of the invention.
Figure 2:
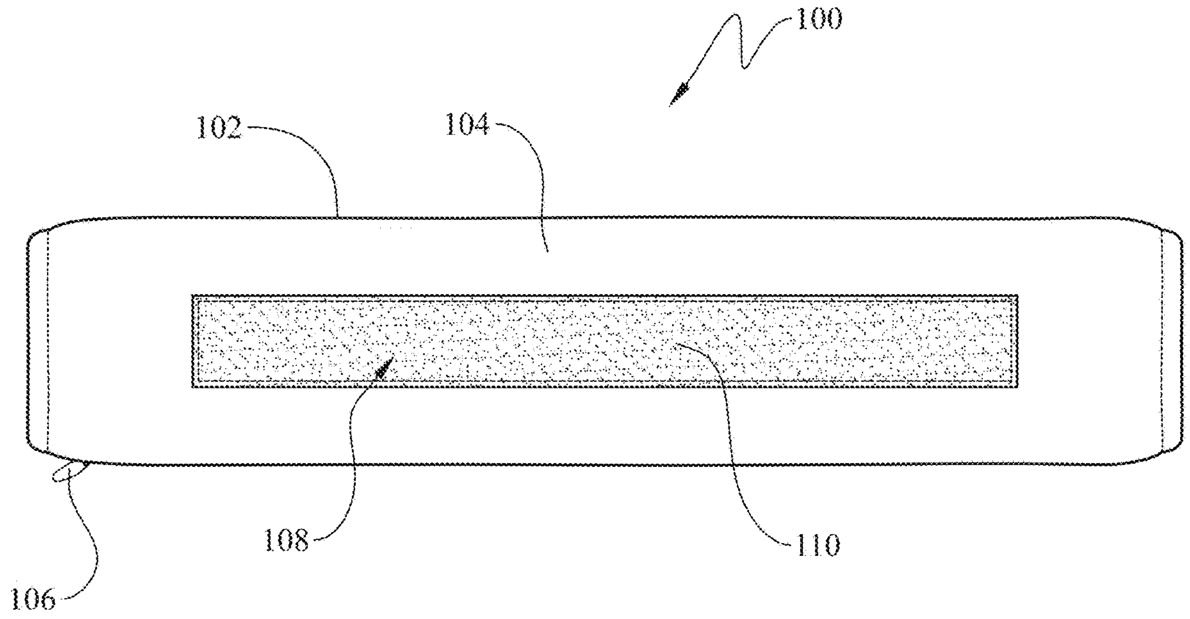
FIG. 2 presents a side view of the device of FIG. 1.
Figure 3:
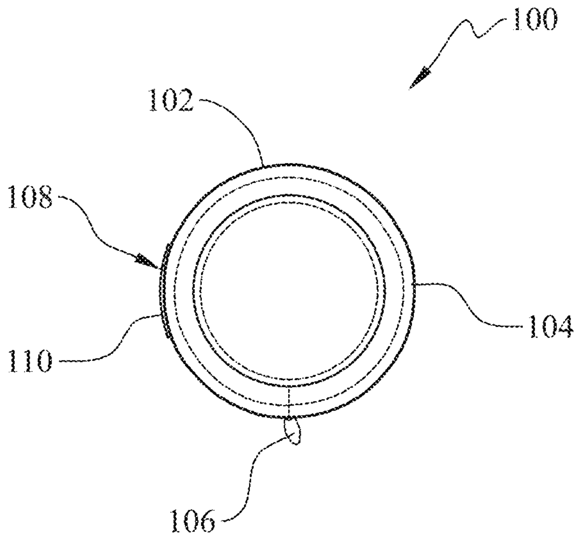
FIG. 3 presents an end view of the device of FIGS. 1 and 2.
Figure 4:
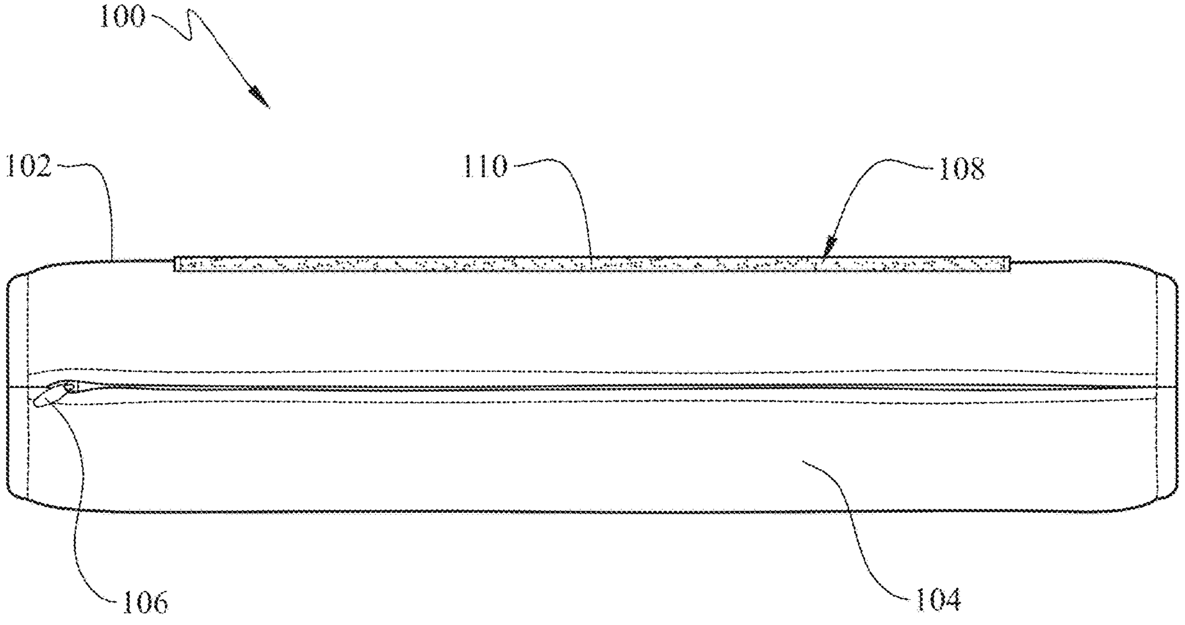
FIG. 4 presents another side view of the device of FIGS. 1 through 3.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and economical device for reducing contact between a wall of a structure and a headboard of a bed frame. In general, the device is intended to and configured for acting as a physical barrier or buffer between the wall and the headboard. In this manner, the device may reduce the likelihood of damage to either the wall or the headboard due to contact therebetween, and/or may reduce noise associated with contact therebetween, especially due to movement of an individual on the bed.

Referring initially to FIGS. 1 through 4, a first embodiment of the device is presented, referred to hereinafter as the device 100, that includes an elongated body 102 and an attachment system 108 for releasably securing the elongated body 102 to a wall (e.g., 300 in FIGS. 7-9) of a structure. In some examples, the elongated body 102 may be secured in an elevated position relative to a floor (e.g., 302 in FIGS. 7-9) of the structure. The elongated body 102 is configured to be located between the wall 300 and a bed frame (e.g., 306 in FIGS. 7-9), for example, a headboard 308 of the bed frame 306, and function as the barrier therebetween. In some examples, the elongated body 102 is configured to reduce the likelihood of damage to the wall 300 and/or the bed frame 306, and/or reduce noise production due to movement of the bed frame 306. In some examples, the elongated body 102 may be configured to provide an increased surface area of contact between the wall 300 and the bed frame 306 relative to direct contact therebetween. In some examples, the elongated body 102 may be configured to provide an increased surface area of contact and/or substantially uniform area of contact between the wall 300 and the bed frame 306 along the headboard 308 of the bed frame 306 relative to direct contact therebetween. In yet other examples, the elongated body 102 may comprise and/or be formed of a cushioning material that is sufficiently compressible to significantly reduce shock and/or impact forces applied thereto from the wall 300 and/or the bed frame 306. Such capabilities may relate to the material(s) of the cushioning material, the thickness, the density, the hardness, etc.

The elongated body 102 has a cylindrical shape with rounded corners at distal ends thereof. Therefore, the elongated body 102 has a circular cross-sectional shape along a central, longitudinal axis of the elongated body 102. In this example, the device 100 is enclosed within a cover 104 that entirely encloses the elongated body 102. An opening extends along a length of the cover 104 parallel to the longitudinal axis of the elongated body 102 when the cover

104 is secured thereto. The opening is sized to allow for insertion and removal of the elongated body 102 therefrom. Embodiments such as this may be beneficial for allowing the cover 104 to be separately cleaned and/or replaced if desired. A fastener device 106 is provided for selectively closing and securing the opening and thereby securing and/or sealing the elongated body 102 within the cover 104. The fastener device 106 may include various types of fasteners including but not limited to zippers, buttons, hook and loop fasteners, snap-type buttons, etc. In this example, the fastener device 106 is a zipper (i.e., a locking teeth fastener).

The attachment system 108 may include a hook and loop fastener for releasably securing the elongated body 102 to the wall 300. As well known, hook and loop fasteners typically include separate first and second portions 110 and 112, one including exposed hooks and the other including exposed loops, that are configured to releasably couple upon contract therebetween. The first portion 110 is secured to the cover 104, for example, via sewing or adhesive, and the second portion 112 may be secured to the wall 300 or the headboard 308. In some embodiments, the second portion 112 of the attachment system 108 may be secured to the wall 300 with a releasable adhesive material such that the second portion 112 may be removed therefrom with a reduced likelihood of damage or alteration to the wall 300. A nonlimiting example of a suitable releasable adhesive material includes adhesive strips commercially available under the brand name Command™ produced by the 3M Company. With this arrangement, the elongated body 102 may be selectively coupled and decoupled from a desired position between the wall 300 and the headboard 308.

Figure 5:
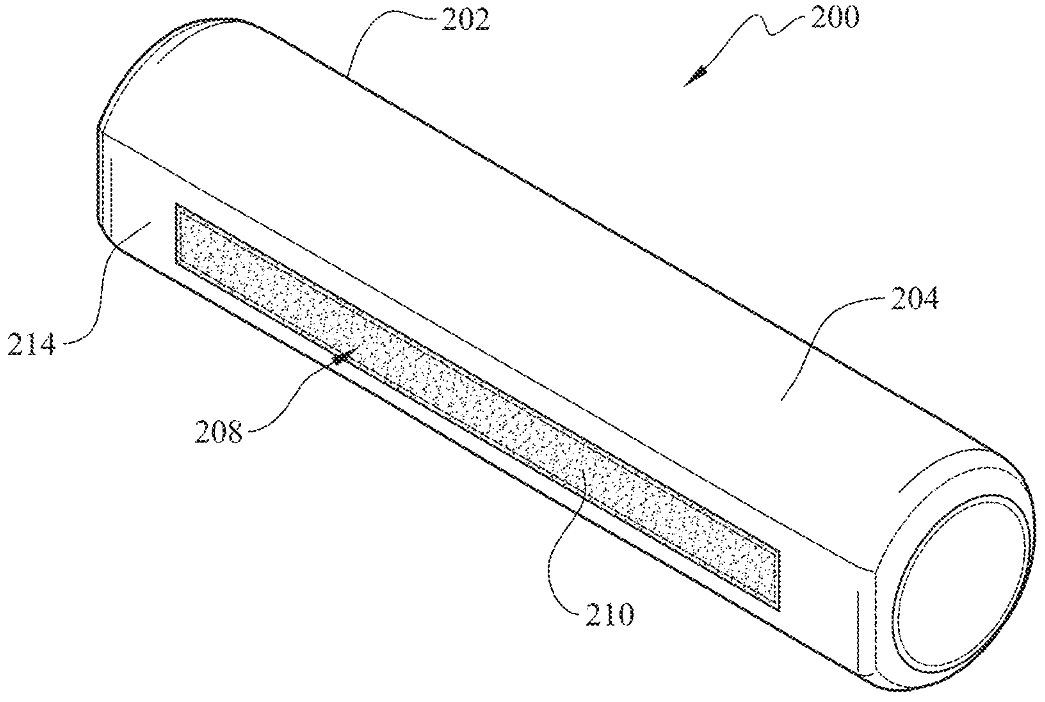
FIG. 5 presents a perspective view of a device for reducing contact between a wall of a structure and a headboard of a bed frame in accordance with a second embodiment of the invention.
Figure 6:
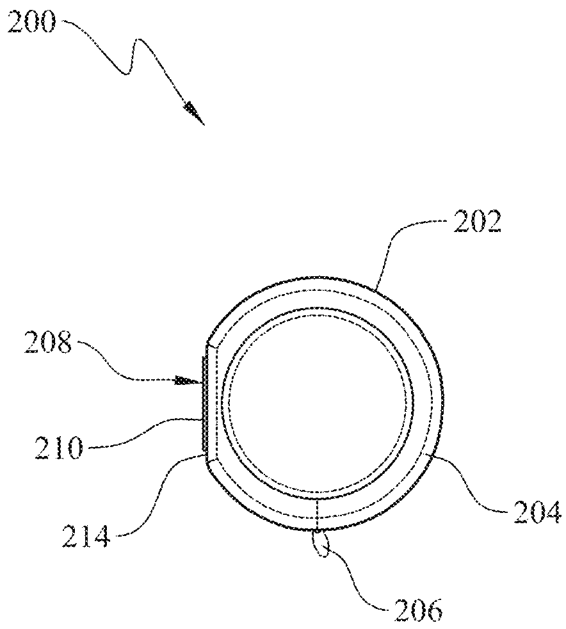
FIG. 6 presents a side view of the device of FIG. 5.

Referring to FIGS. 5 and 6, a second embodiment of the device is presented, referred to hereinafter as the device 200 that includes an elongated body 202, a cover 204 enclosing the elongated body 202, and an attachment system 208. In view of similarities between the first and second embodiments, the following discussion of the second embodiment will focus primarily on aspects of the second embodiment that differ from the first embodiment in some notable or significant manner. Other aspects of the second embodiment not discussed in any detail can be, in terms of structure, function, materials, etc., essentially as was described for the first embodiment. For convenience, identical reference numerals are used in FIG. 2 to denote the same elements described for the device 100 of FIGS. 1 through 4 but with a numerical prefix (2) added to distinguish the second embodiment from the embodiment of FIG. 1.

In the second embodiment, the elongated body 202 has a truncated cylindrical shape with a planar surface 214 extending along a length of the elongated body 202. Therefore, the elongated body 202 has a truncated, circular cross-sectional shape along the longitudinal axis of the elongated body 202. The cover 204 includes a shape corresponding to the elongated body 202 and the first portion 210 of the attachment system 208 is secured to the cover 204 in an area configured to overlay the planar surface 214 of the elongated body 202 when the elongated body 202 is within the cover 204. In certain applications, the shape of the planar surface 214 may promote complete contact between the first and second portions 210 and 212 of the attachment system 208 and/or may reduce a rolling action between the device 200 and the wall 300 or the headboard 308 (whichever the device 200 is coupled to).

The devices 100 and 200 provide for a method for reducing contact between the wall 300 of the structure and the headboard 308 of the bed frame 306. The method may include providing the device 100/200 that includes the elongated body 102/202 comprising the cushioning material, securing the elongated body 102/202 to the wall 300 of the structure in an elevated position relative to the floor 302 with the attachment system 108/208 of the device 100/200, locating the headboard 308 of the bed frame 306 adjacent to and/or in contact with the device 100/200 such that the device 100/200 is between the wall 300 and the headboard 308 of the bed frame 306, and using the elongated body 102/202 as a physical barrier between the wall 300 and the headboard 308 when secured to the wall 300 with the attachment system 108/208.

The method may include positioning the device 100/200 such that the elongated body 102/202 provides uniform resistance along the headboard 308 when in contact therewith. If the elongated body 102 has a cylindrical shape, the method may include contacting the wall 300 and the headboard 308 with curved surfaces of the device 100. If the elongated body 202 has a truncated cylindrical shape with the planar surface 214 extending along the length of the elongated body 202, the method may include positioning the elongated body 202 such that the planar surface 214 contacts the wall 300. In such embodiments, the attachment system 208 may be secured to the planar surface 214 of the elongated body 202.

The method may include removably enclosing the elongated body 102/202 within the cover 104/204 of the device 100/200. In such embodiments, the cover 104/204 may include the opening sized to receive the elongated body 102/202 therethrough and the method may include selectively closing and securing the opening with the fastener device 106/206, such as a zipper.

In some embodiments, the attachment system 108/208 may include a hook and loop fastener and the method may include securing a portion 112/212 of the hook and loop fastener to the wall 300 with a releasable adhesive material.

Figure 7:
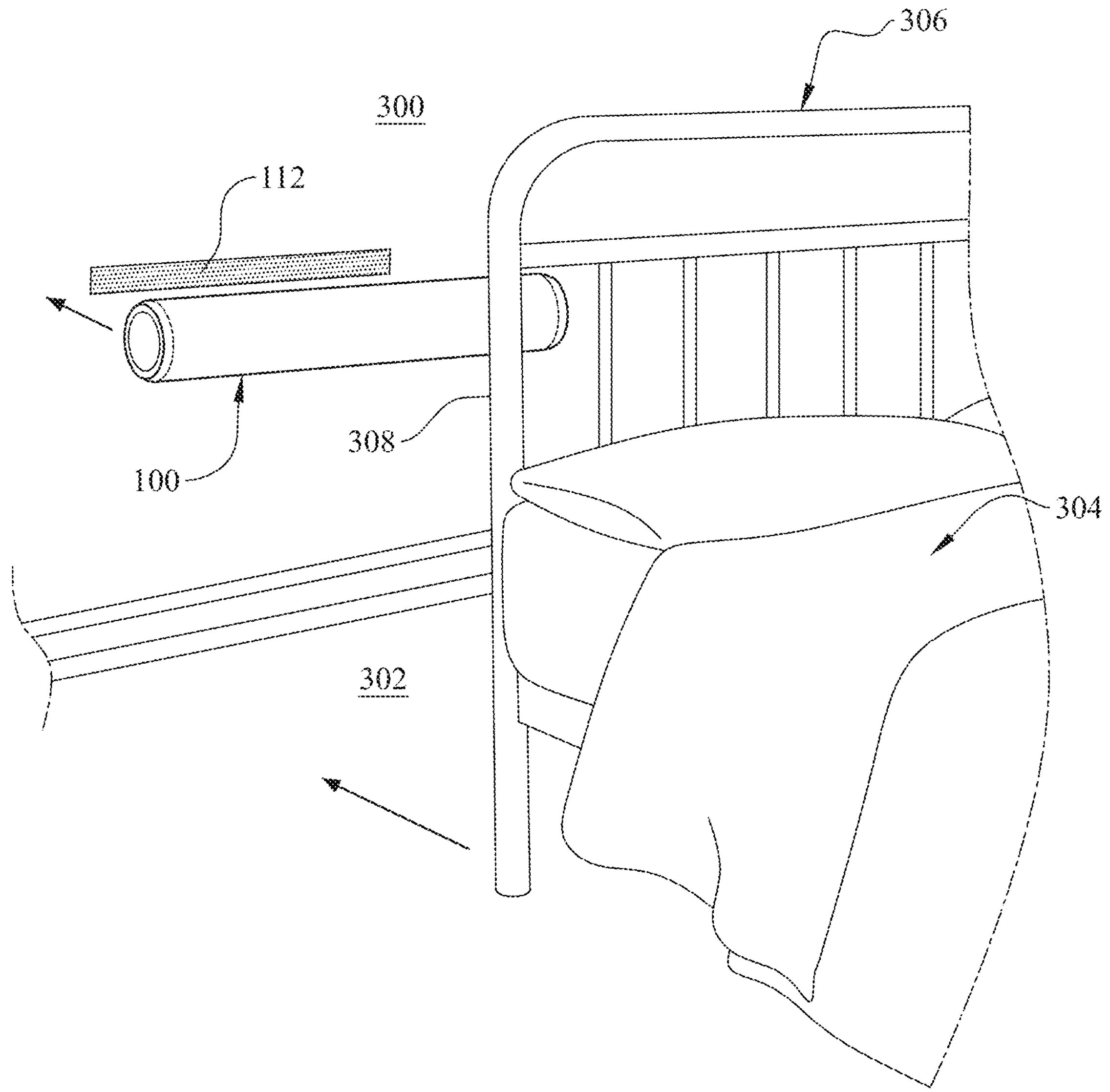
FIG. 7 presents a perspective view of the device of FIGS. 1 through 4 and illustrates a method of positioning the device and a bed frame relative to a wall.
Figure 8:
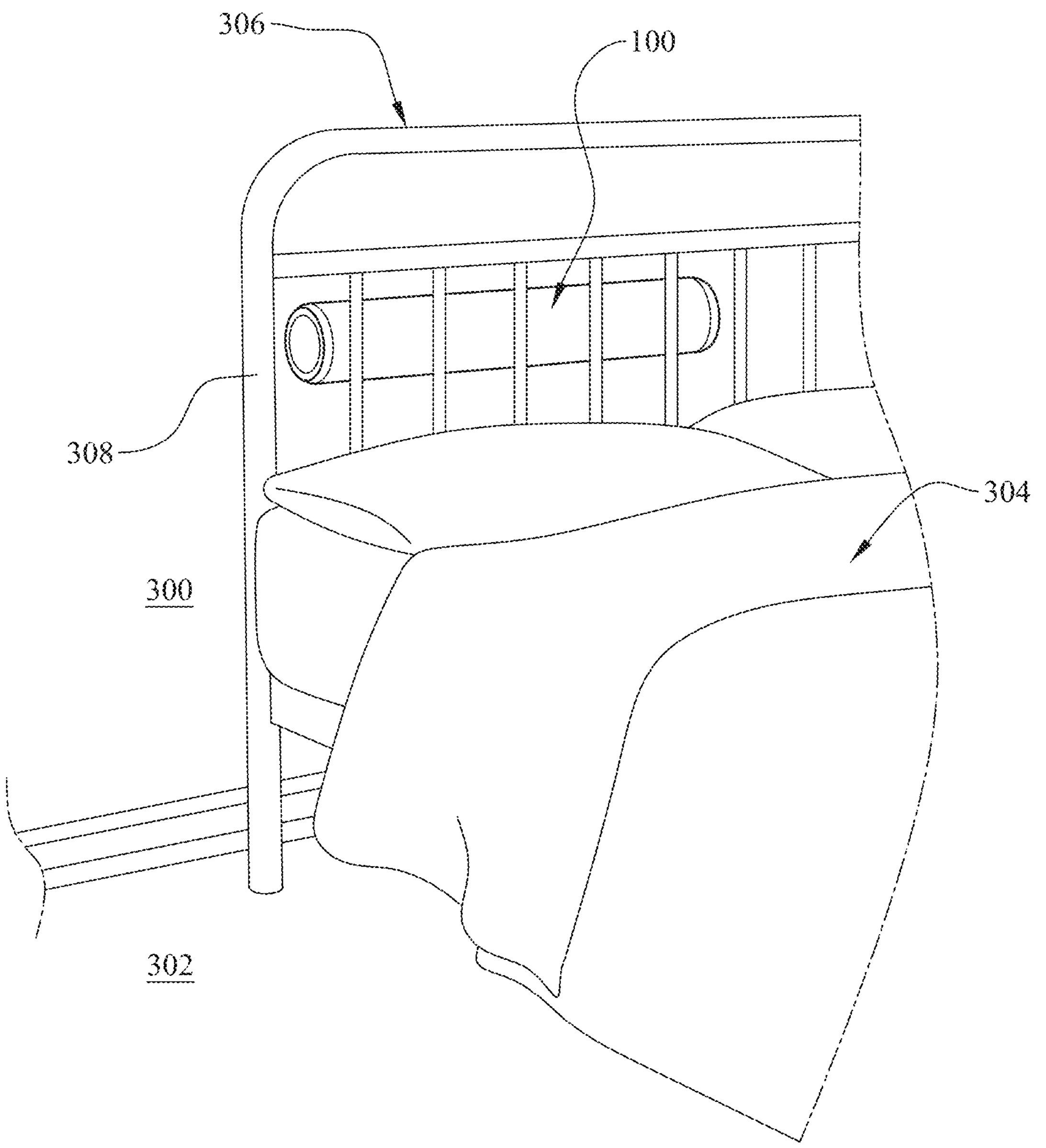
FIG. 8 presents a perspective view of the device of FIGS. 1 through 4 as installed in accordance with the method of FIG. 7.
Figure 9:
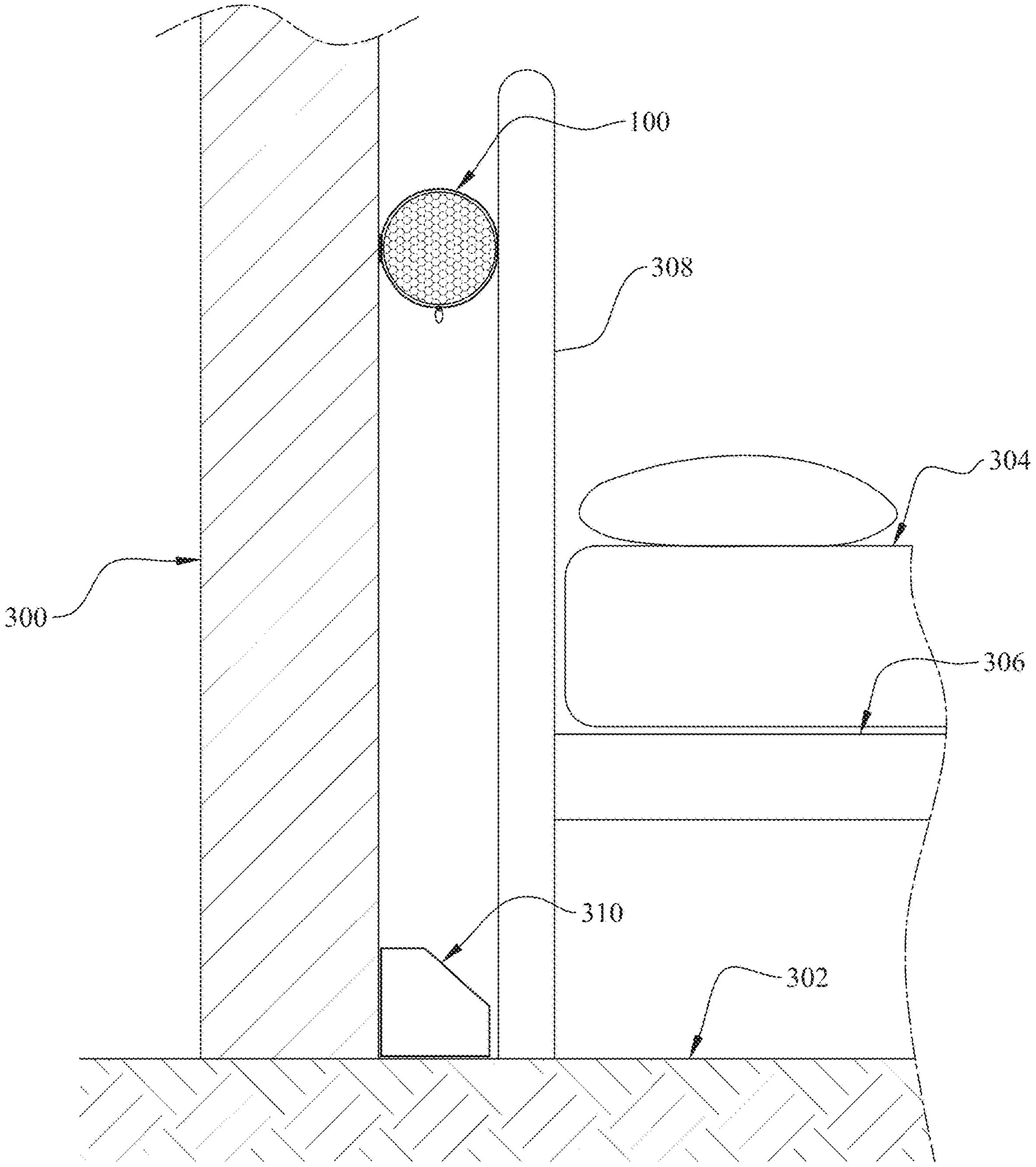
FIG. 9 presents an end view of the device of FIGS. 1 through 4 as installed in accordance with the method of FIG. 7.

As an example, FIGS. 7 through 9 present the nonlimiting method of installation of the device 100. FIG. 7 shows the second portion 112 of the attachment system 108 as initially secured to the wall 300 of the structure. In this instance, the second portion 112 includes an elongated strip that is oriented substantially parallel to the floor 302 of the structure. The elongated body 102 is oriented and located in a position such that the first portion 110 of the attachment system 108 is aligned with and contacts the second portion 112 of the attachment system 108. In this manner, the device 100 may be secured to the wall 300 such that the elongated body 102 is located in an elevated, substantially horizontal position relative to the floor 302. After the device 100 has been secured to the wall 300, the bed 304 may be positioned such that the headboard 308 of the bed frame 306 is adjacent to or in contact with the device 100. In certain embodiments, the device 100 may be configured to provide a predetermined spacing between the wall 300 and the bed frame 306. For example, FIG. 9 shows the device 100 as providing sufficient spacing between the wall 300 and the headboard 308 such that the bed frame 306 is prevented from contacting a baseboard radiator 310 of the structure.

Alternative embodiments are contemplated in addition the embodiments(s) shown and/or described herein. For example, the elongated body (and therefore the cover if included) may have other exterior and cross-sectional shapes, the cover may be omitted, and/or other types of fastener devices may be used for securing the opening and/or for the attachment system. In addition, the device may be used in applications other than described herein, that is, the device may be used as a barrier between objects other than a wall of a structure and/or a bed frame. As a nonlimiting example, the device may be used between a wall of a structure and another type of furniture (e.g., chair, cabinet, couch, etc.).

The device and the components thereof may be formed of various materials including certain polymeric, metallic, ceramic, and composite materials. In some examples, the elongated body may include a solid body having an open or closed cell foam structure formed of a polymeric material. Nonlimiting examples include but are not limited to polystyrene foam (EPS), polyethylene foam (EPE), polyurethane foam (EPU), and ethylene-vinyl acetate (EVA). In other embodiments, the elongated body may include a rigid, reinforced polymeric core with an exterior layer of the cushioning material such as a foam material (e.g., EPE or EVA). In some embodiments, the cover may comprise a woven or non-woven fabric material (natural or synthetic).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A device for reducing contact between a wall of a structure and a headboard of a bed frame, the device comprising:

an elongated body comprising opposite proximal and distal surfaces and extending between opposite first and second ends, the elongated body being made from a cushioning material; and an attachment system for releasably securing the elongated body to the wall of the structure in an elevated position relative to a floor of the structure and between the wall and the headboard of the bed frame; wherein the elongated body is configured to function as a physical barrier between the wall and the headboard when secured to the wall with the attachment system, wherein the elongated body has a truncated cylindrical shape with a planar surface extending along a length of the elongated body, and wherein the attachment system comprises a hook and loop fastener extending continuously from the first end to the second end, the hook and loop fastener being positioned equidistant between the proximal and distal surfaces.

2. The device of claim 1, wherein the elongated body is formed from the cushioning material.

3. The device of claim 1, wherein the elongated body is formed from a foam material.

4. The device of claim 1, wherein the hook and loop fastener is secured to the planar surface of the elongated body.

5. The device of claim 1, wherein the device includes a cover configured to enclose the elongated body.

6. The device of claim 5, wherein the cover is configured to be removable from the elongated body.

7. The device of claim 5, wherein the cover includes an opening sized to receive the elongated body therethrough and a fastener device for selectively closing and securing the opening.

8. The device of claim 7, wherein the fastener device is a zipper.

9. The device of claim 1, wherein the hook and loop fastener includes a first portion that is fixed to the elongated body and a second portion that is coupled to the wall.

10. The device of claim 9, wherein the second portion of the hook and loop fastener is secured to the wall with a releasable adhesive material.

11. The device of claim 1, wherein the first end includes a first end surface and the second end includes a second end surface, the hook and loop fastener being spaced apart from the end surfaces.

12. The device of claim 1, wherein the elongated body has rounded corners at the first end and the second end.

13. The device of claim 1, wherein the planar surface extends an entire length of the elongated body.

14. A device for reducing contact between a wall of a structure and a headboard of a bed frame, the device comprising:

an elongated body comprising a cushioning material, the elongated body having a truncated cylindrical shape with a planar surface extending along the length of the elongated body; and an attachment system for releasably securing the elongated body to the wall of the structure in an elevated position relative to a floor of the structure and between the wall and the headboard of the bed frame, the attachment system being secured to the planar surface of the elongated body, wherein the elongated body is configured to function as a physical barrier between the wall and the headboard when secured to the wall with the attachment system, and wherein the attachment system comprises a hook and loop fastener extending continuously from the first end to the second end, the hook and loop fastener being positioned equidistant between the proximal and distal surfaces.

15. The device of claim 14, wherein the device includes a cover configured to enclose the elongated body, and further wherein the cover is configured to be removable from the elongated body.

16. The device of claim 15, wherein the cover includes an opening sized to receive the elongated body therethrough and a fastener device for selectively closing and securing the opening.

17. The device of claim 16, wherein the fastener device is a zipper.

18. The device of claim 14, wherein the hook and loop fastener includes a first portion that is fixed to the elongated body and a second portion that is coupled to the wall.

19. The device of claim 18, wherein the second portion of the hook and loop fastener is secured to the wall with a releasable adhesive material.

20. A device for reducing contact between a wall of a structure and a headboard of a bed frame, the device comprising:

an elongated body comprising a cushioning material, the elongated body having a truncated cylindrical shape with a planar surface extending along the length of the elongated body;

an attachment system for releasably securing the elongated body to the wall of the structure in an elevated position relative to a floor of the structure and between the wall and the headboard of the bed frame, the attachment system being secured to the planar surface of the elongated body and including a includes a hook and loop fastener, the hook and loop fastener being secured to the wall with a releasable adhesive material; and a cover configured to enclose and be removable from the elongated body, the cover including an opening sized to receive the elongated body therethrough and a fastener device for selectively closing and securing the opening, wherein the elongated body is configured to function as a physical barrier between the wall and the headboard when secured to the wall with the attachment system, and wherein the hook and loop fastener extending continuously from the first end to the second end, the hook and loop fastener being positioned equidistant between the proximal and distal surfaces.

* * * * *